United States Patent [19]
Josephy et al.

[11] Patent Number: 5,585,193
[45] Date of Patent: Dec. 17, 1996

[54] MACHINE-DIRECTION ORIENTED LABEL FILMS AND DIE-CUT LABELS PREPARED THEREFROM

[75] Inventors: Karl Josephy, Los Angeles, Calif.; Mitchell J. Rackovan, Madison; Donald F. Kimes, Perry, both of Ohio

[73] Assignee: Avery Dennison Corporation, Pasadena, Calif.

[21] Appl. No.: 372,589

[22] Filed: Jan. 13, 1995

Related U.S. Application Data

[63] Continuation-in-part of Ser. No. 93,099, Jul. 16, 1993, Pat. No. 5,451,283.

[51] Int. Cl.⁶ ........................................ B32B 27/08
[52] U.S. Cl. ................ 428/515; 428/195; 428/200; 428/212; 428/335; 428/411.1; 428/426; 428/500; 428/522; 428/914; 428/926
[58] Field of Search .................... 428/336, 516, 428/910, 366, 195, 200, 212, 335, 411.1, 426, 500, 515, 522, 914, 926

[56] References Cited

U.S. PATENT DOCUMENTS

| | | |
|---|---|---|
| 4,581,262 | 4/1986 | Karabedian ........................ 428/35 |
| 4,585,679 | 4/1986 | Karabedian . |
| 4,713,273 | 12/1987 | Freedman ........................ 428/40 |
| 5,186,782 | 2/1993 | Freedman . |
| 5,321,081 | 6/1994 | Chundury et al. ............. 525/98 |
| 5,435,963 | 7/1995 | Rackovan et al. ............ 264/509 |
| 5,456,979 | 10/1995 | Schirmer ...................... 428/336 |

OTHER PUBLICATIONS

International Search Report PCT/US96/00143 mailed Mar. 27, 1996.

*Primary Examiner*—William A. Krynski
*Attorney, Agent, or Firm*—Renner, Otto, Boisselle & Sklar

[57] ABSTRACT

A die-cut label is described which is prepared from a composite which comprises (A) an extruded cast multilayer film oriented in the machine-direction at a stretch ratio between about 2 and about 9 which comprises (A-1) at least one skin layer comprising an olefin-SPA blend comprising from about 30% to about 60% by weight of SPA; and (A-2) at least one relatively thick inner layer comprising a mixture of an olefin-SPA blend and a compatibilizer wherein the mixture comprises greater than 15% by weight up to about 40% by weight SPA, and wherein the total thickness of said at least one skin layer (A-1) and said inner layer (A-2) is less than about 3 mils; and (B) an adhesive layer associated with said film for adhering said label to a substrate.

21 Claims, 1 Drawing Sheet

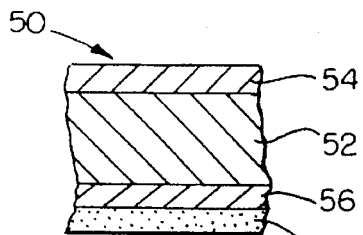
FIG. 1
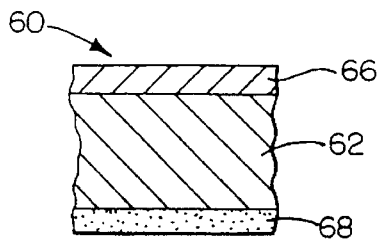
FIG. 2
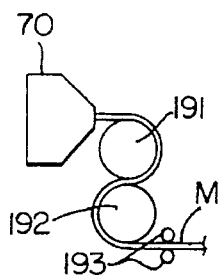
FIG. 3A
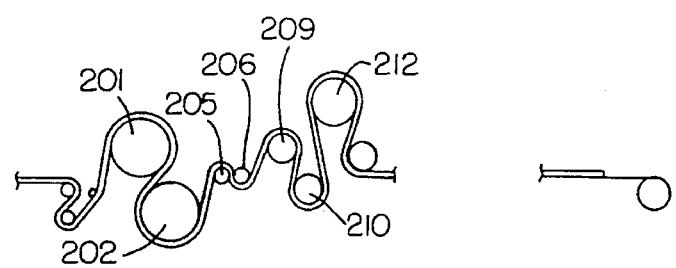
FIG. 3B
FIG. 3C
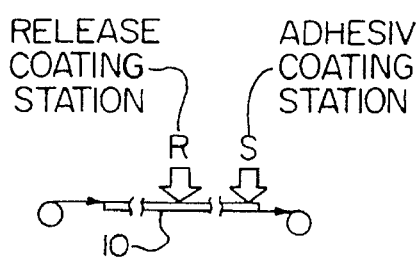
FIG. 4A
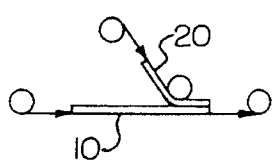
FIG. 4B
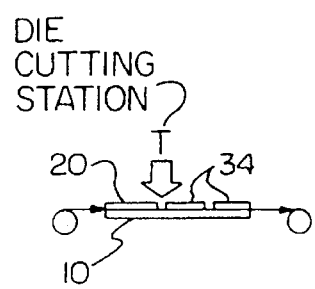
FIG. 4C
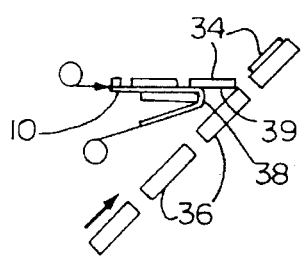
FIG. 4D

MACHINE-DIRECTION ORIENTED LABEL FILMS AND DIE-CUT LABELS PREPARED THEREFROM

CROSS REFERENCE TO RELATED APPLICATION

This application is a continuation-in-part of application Ser. No. 08/093,099 filed Jul. 16, 1993, now U.S. Pat. No. 5,451,283. The disclosure of said prior application is incorporated herein in its entirety.

FIELD OF THE INVENTION

This invention relates to a method of preparing die-cut labels from machine-direction oriented multilayer films. The invention also relates to machine-direction oriented polymer films exhibiting improved die-cuttability.

BACKGROUND OF THE INVENTION

It has long been known to manufacture and distribute pressure-sensitive adhesive stock for labels by providing a layer of face or facestock material for the label or sign backed by a layer of pressure-sensitive adhesive which in turn is covered by a release liner or carrier. The liner or carrier protects the adhesive during shipment and storage and allows for efficient handling of an array of individual labels after the labels are die-cut and matrix stripped from the layer of facestock material and up to the point where the individual labels are dispensed in sequence on a labeling line. During the time from die-cutting to dispensing, the liner or carrier remains uncut and may be rolled and unrolled for storage, transit and deployment of the array of individual labels carried thereon.

In many label applications, it is desirable that the facestock material be a film of polymeric material which can provide properties lacking in paper, such as durability, strength, water-resistance, abrasion-resistance, gloss and other properties. Generally, facestock material of thicknesses greater than about 3 mils have been used in order to assure dispensability in automatic labeling apparatuses. However, it is desirable to reduce the thickness or "downgauge" the facestock material in order to attain savings in material costs. Such reduction in label thickness often has resulted in reduced stiffness and the inability to dispense the labels in a reliable commercially acceptable manner using automatic machinery.

Failure to reliably dispense is typically characterized by the label following the carrier around a peel plate without dispensing or "standing-off" from the carrier for application to the substrate. Such failure to dispense is believed to be associated with excessive release values, between the label facestock material and the liner. The release level also is dependent upon the stiffness of the facestock. Failure to dispense may also be characterized by the folding of the label due to lack of label stiffness at the dispensing speed as it is transferred from the carrier to the substrate. Another particular need in many labeling applications is the ability to apply polymeric-film labels at high line speeds, since an increase in line speed has obvious cost saving advantages.

Polymeric materials which have been suggested in the prior art as useful in preparing labels include polymeric biaxially-oriented polypropylene ("BOPP") which is relatively inexpensive and dispenses well. Such films tend to have sufficient stiffness for dispensing, but they also have relatively high tensile modulus values in both machine-direction (MD) and cross-direction (CD) which results in unacceptable conformability characteristics. Another useful material is unoriented polyethylene that is also relatively inexpensive and conformable. However, unoriented polyethylene generally is difficult to die-cut consistently and does not dispense very well.

In general, the prior art polymeric film labels have not been entirely satisfactory in die-cut label applications, particularly those involving polymeric-film materials less costly than "vinyl," i.e., polyvinylchloride (PVC). For example, down-gauging of polymeric-film labeling stock for improved economy has been inhibited by dispensing problems and the speed of label application lines has been limited when applying polymeric-film labeling stock less costly than PVC but still otherwise suitable for die-cut labels used on flexible or rigid substrates.

When the biaxially-oriented films are applied to rigid substrates such as glass bottles, the application is not completely successful due to the tendency of the relatively stiff label to bridge surface depressions and mold seams resulting from bottle-forming processes which results in an undesirable surface appearance simulating trapped air bubbles. This has impeded the use of pressure-sensitive adhesive labels to replace prior glass bottle labeling techniques such as ceramic ink directly bonded to the bottle surface during glass bottle manufacturing processes. Such ceramic ink techniques are environmentally undesirable due to objectionable ink components and the contamination by the ink of the crushed bottle glass in recycling processing.

The machine-direction-oriented labels of the present invention are to be contrasted with shrink-films consisting of stretched, unannealed films, sometimes used in sleeve-labeling applications wherein a sleeve or wrap of shrink film is placed around the circumference of a bottle or can or like container and heated to cause it to shrink into light, surrounding engagement with a container. Examples of such shrink film labels are found in U.S. Pat. Nos. 4,581,262 and 4,585,679. The tendency to shrink causes such film to tend to withdraw from any borders leaving exposed adhesive. The exposed adhesive presents a particular disadvantage in die-cut label applications since the exposed adhesive is unsightly and tends to catch dust.

Resinous film-forming materials which are blends of "soft" polar additives ("SPA") such as ethylene vinyl acetate copolymer (EVA) with low-cost olefinic base materials such as polypropylene, polyethylene, or combinations thereof including propylene-ethylene copolymers, blends of polyethylene and polypropylene with each other, or blends of either or both of them with polypropylene-polyethylene copolymer have been suggested as useful in preparing die-cut labels. In U.S. Pat. No. 5,186,782, extruded heat-set polymeric films are described which are die-cut into labels and applied to deformable or squeezable workpieces after being treated differently in their lengthwise and cross directions so as to have different stiffnesses in the respective directions. The polymeric films described in the '782 patent include heat-set unilayer films, and specifically films of polyethylene, as well as multilayer films which may comprise a coextrudate including an inner layer, a skin layer on the face side of the coextrudate, and optionally a skin layer on the inside of the coextrudate opposite the face side. A pressure-sensitive adhesive layer is generally applied to the inner side of the coextrudate. Preferred materials disclosed for use in the skin and inner layers comprise physical blends of (1) polypropylene or copolymers of propylene and ethylene and (2) ethylene vinyl acetate (EVA) in weight ratios ranging from 50/50 to 60/40. The core material also may be polyethylene of low, medium or high density between about 0.915 and 0.965 specific gravity.

SUMMARY OF THE INVENTION

A die-cut label is described which is prepared from a composite which comprises (A) an extruded multilayer film machine-direction oriented at a stretch ratio between about 2 and about 9 which comprises (A-1) at least one skin layer comprising an olefin-SPA blend comprising from about 30% to about 60% by weight of SPA; and (A-2) at least one relatively thick inner layer comprising a mixture of an olefin-SPA blend and a compatibilizer wherein the mixture comprises greater than 15% by weight up to about 40% by weight SPA, and wherein the total thickness of said at least one skin layer (A-1) and said inner layer (A-2) is less than about 3 mils; and (B) an adhesive layer associated with said film for adhering said label to a substrate.

A method for manufacturing machine-direction oriented multilayer films useful for preparing die-cut conformable labels also is described which comprises the steps of (A) heating and melting such blends; (B) extruding said melted blends into a layered film comprising (B-1) at least one skin layer comprising an olefin-SPA blend containing from about 30% to about 60% by weight of SPA; and (B-2) at least one relatively thick inner layer comprising a mixture of an olefin-SPA blend and a compatibilizer wherein the mixture contains greater than 15% up to about 40% by weight of SPA; and (C) hot stretching and annealing said film to form a machine-direction oriented multilayer film oriented in the machine-direction having an overall thickness of less than 3 mils and to impart differentials between the machine-direction and cross direction stiffness of the oriented film such that the machine-direction stiffness is greater than the cross direction stiffness and whereby the resulting oriented film is conformable. Multilayer films prepared by the method of the invention exhibit improved die-cuttability when compared to a reference film of the same thickness formed under the same conditions from the same olefin-SPA blends except that the SPA content of the inner layer is 15% or less, or greater than about 40% by weight.

BRIEF DESCRIPTION OF THE DRAWINGS

FIGS. 1 and 2 are cross-sections of facestock constructions useable in the practice of the invention.

FIGS. 3A–3C schematically illustrate film extrusion and ensuing line processes pertinent to the invention.

FIGS. 4A–4D schematically illustrate certain manufacturing steps related to the preparation of and use of the die-cut labels of the invention.

DESCRIPTION OF THE PREFERRED EMBODIMENTS

The present invention involves the discovery that a composite comprising (A) an extruded multilayer film machine-direction oriented at a stretch ratio between about 2 and 9; and (B) an adhesive layer associated with said film for adhering said label to a substrate exhibits improved die-cuttability when the extruded multilayer film comprises (A-2) at least one skin layer comprising an olefin-SPA blend comprising from about 30% to about 60% by weight of SPA; and (A-2) at least one relatively thick inner layer comprising a mixture of an olefin-SPA blend and a compatibilizer wherein the mixture comprises greater than 15% by weight up to about 40% by weight of SPA, and wherein the total thickness of said at least one skin layer (A-1) and said inner layer (A-2) is less than about 3 mils.

The olefins of the olefin-SPA blend used in the preparation of the inner layer and skin layers are generally olefinic base materials including homopolymers and copolymers of ethylene, propylene, butene, pentene, etc. Preferably, the olefinic base materials comprise polypropylene, and copolymers such as propylene-ethylene copolymers and propylene-1-butene copolymers. Blends of polypropylene and polyethylene with each other, or blends of either or both of them with polypropylenepolyethylene copolymer also is useful. In one preferred embodiment, the olefin materials are those with a very high propylenic content, either polypropylene homopolymer or propylene-ethylene copolymers, or blends of polypropylene and polyethylene with low ethylene content, or propylene-1-butene copolymers or blends of polypropylene and poly-1-butene with low butene content. Preferably, the propylene-ethylene copolymers or blends will contain less than about 10% of ethylenic content and more often will contain less than about 6% ethylenic content. The propylene-1-butene copolymers or blends will preferably contain from about 3% up to about 15% by weight of 1-butene. Polymers and copolymers useful as the olefin in the olefin-SPA blends may be obtained by polymerization of one or more olefins using single-site metallocene catalysts. Such polymers and copolymers are available from Exxon Chemical Co. and Dow Chemical Co.

Propylene copolymers are preferred in preparing the film and labels of the invention. Examples of the types of propylene copolymers which are useful in the present invention include Polypropylene DS6D20, a propylene random copolymer which contains about 3.2% by weight of ethylene and is available from Shell Chemical Company. This polymer has a melt flow of 1.9 g/10 min, a density of 0.895 g/cc at 23° C., a tensile yield strength of 3800 psi, and a yield elongation of 13%. The melting temperature of the copolymer (DSC) is 300° F. Polypropylene DS6D81 is a polypropylene random copolymer available from Shell Chemical Company which contains 5.5% by weight of ethylene. This random copolymer is characterized as having a melt flow of 4.5 g/10 min, a tensile yield strength of 3200 psi, a tensile yield elongation of 12% and a flexural modulus (1% secant) of 90,000 psi. Polypropylene SRD4-127 is a random copolymer of propylene and 1-butene containing from about 8% by weight of butene. This polymer is available from Shell Chemical Company and is characterized as having a melt flow of 8 g/10 min, an MD tensile modulus of 96,200 psi, and an MD elongation of 840%. These are recent commercial resins, and more recent examples of similar copolymers are SRD4-126, SRD4-128, SRD4-130, and SRD4-131. Polypropylene SRD4-104 is a random copolymer of propylene and 1-butene containing about 11% butene. This polymer is available from Shell Chemical Co. and is characterized as having a melt flow of 5.0 g/10 min, an MD tensile modulus of 90,700 psi and an MD elongation of 725%. Propylene SRD4-105 is a random copolymer of propylene and 1-butene containing about 14% by weight of 1-butene. This polymer is available from Shell Chemical Co. and is characterized as having a melt flow of 5.0 g/10 min, an MD tensile modulus of 65,500 psi and an MD elongation of 780%. An example of a propylene homopolymer useful in the present invention is the homopolymer identified as 5C97/5A97 available from Shell Chemical Co. This homopolymer is characterized as having a melt flow of 3.9 g/10 min, a melting point (DSC at second heat cycle) of 162° C., a tensile yield strength of 4,900 psi, a tensile yield elongation of 10% and a flexural modulus (1% secant) of 230,000 psi.

The soft polar additives (SPA) of the olefin SPA blends generally comprise random copolymers of an olefin and a more polar moiety. The random copolymer is softer than and is immiscible in the olefinic base materials. A presently preferred soft polar additive is ethylene vinyl acetate copolymer (EVA). In particular, a commercially available EVA which is useful contains 19% vinyl acetate and has the following characteristics: tensile modulus (1% secant), 5300 psi; ultimate tensile strength, 2150 psi; ultimate elongation, 730%; hardness, 87 Shore A. Although EVA is presently most preferred, alternative materials useful as soft polar additives in the olefin-SPA blends include ethylene methyl acrylate (EMA) and acrylonitrile butadiene rubber.

Such blends of olefinic base materials with soft polar additives are referred to herein as olefin-soft polar additive blends, or "olefin-SPA blends," and more particularly, when appropriate, as "olefin-EVA blends." The soft polar additives are to be distinguished from "hard" polar additives which include polyamides (e.g., nylon), polyesters (e.g., polyethylene terephthalate), and polystyrene. Both the hard and soft polar additives are generally characterized by incompatibility with the olefinic base materials so that the blend of the additive and base forms an immiscible mix of separate domains consisting of one or the other.

As mentioned above, the composites of the present invention comprise at least one skin layer comprising an olefin-SPA blend comprising from about 30% to about 60% by weight of SPA. In other embodiments, the olefin-SPA blend used in the skin layer will contain from about 40% to about 60% by weight of SPA, and in another embodiment, about 50% by weight of SPA. When the composites of the present invention contain two skin layers, it is desirable that the two skin layers be "balanced" and of similar or identical makeup so that the composite film will have no tendency to cuff or otherwise reflect an unbalanced structural nature.

The inner layer of the multilayer films of the present invention generally are relatively thick compared to the thickness of the skin layers, and the inner layer will comprise a mixture of an olefin-SPA blend and a compatibilizer. The mixture of compatibilizer and olefin-SPA blend utilized in the inner layer comprises greater than 15% by weight up to about 40% by weight of SPA. Any of the olefin and olefin blends described above as being useful in the skin layer can be utilized in the inner layer. In other embodiments, the mixture of inner layer may contain from about 20% to about 40%, or from about 25% to about 40% or even from about 25% to about 35% by weight of SPA. Improved die-cuttability of the multilayer film is observed when the inner layers have the specified SPA contents. In one embodiment, the die-cuttability of multilayer films which are less than about 3 mils in thickness is improved when the SPA content of the inner layer is between about 25% and about 35% by weight.

As noted above, the inner layers of the multilayer films of the present invention also contain at least one compatibilizer. A compatibilizer also may be included in the skin layer but is not required. The inner layer of the multilayer films of the present invention will contain up to about 10% by weight or more of at least one compatibilizer, and more often, the inner layer will contain about 5% or less of at least one compatibilizer. The compatibilizers utilized in the present invention comprise a polyolefin copolymerized with or grafted by a polar reactant. It is believed upon extrusion through the hot die, the soft polar additive and the olefinic base material are chemically coupled by the compatibilizer. The polyolefins which may be copolymerized with or grafted by a polar reactant to form the compatibilizer useful in the present invention may be polyethylene or polypropylene. When the preferred EVA is used as the SPA, and the olefinic base material of the EVA-olefinic blend is wholly or primarily polyethylene, the graft polymer of the compatibilizer may be polyethylene. For example, the compatibilizer may be an acrylic acid modified polyethylene graft copolymer. When, as presently preferred, the olefinic base material of the olefin EVA blend is wholly or primarily polypropylene, the grafted polymer of the compatibilizer may be polypropylene. The compatibilizer in this instance may be an acrylic acid modified polypropylene graft copolymer such as Polybond® 1003 available from BP Chemicals, Hackettstown, N.J., or a maleated polypropylene graft copolymer such as Polybond®3001 also available from BP Chemicals. These compatibilizers or coupling agents are generally of a type heretofore known to be useful to enhance the physical and thermal properties of polyolefins filled or reinforced with glass, mica or talc, or useful to promote adhesion between polyolefins and glass, wood, paper, leather and polar polymers including polyesters, polyurethane, ethylene vinyl alcohol (EVOH) and nylon. These compatibilizers may be referred to as carboxylated or maleated polyolefins.

Inorganic fillers may be used to provide opaque film label stock. Useful fillers include calcium carbonate, titanium dioxide and blends thereof. The fillers may be included in any of the layers of the multilayer film. When a filler is incorporated to form an opaque film, the filler generally is included in the inner layer. The amount of filler, based on the total weight of multilayer film may range from about 5% to about 30% by weight and is more often between 10% and 20% by weight.

Examples of multilayer films which are useful in the present invention are illustrated in FIGS. 1 and 2. In FIG. 1, a multilayer web construction, generally indicated by the reference numeral 50 comprises a coextrudate including an inner layer 52, a skin layer 54 on the face side of the coextrudate and a skin layer 56 on the back side of the coextrudate opposite the face side. In the embodiment illustrated in FIG. 1, an adhesive layer 58 is shown on the back side of the coextrudate. FIG. 2 illustrates another multilayer web construction generally indicated by the reference numeral 60 which comprises a coextrudate including an inner layer 62, and a skin layer 66 on the face side of the coextrudate. On the back side of the coextrudate is an adhesive layer 68.

As noted above, the layers of the coextrudate of FIGS. 1 and 2 comprise olefin-SPA blends, are formed by simultaneous extrusion from a suitable known type of coextrusion die, and are adhered to each other in a permanently combined state to provide a unitary coextrudate.

As noted above, the inner layer is relatively thick compared to the skin layer or layers. Thus, the inner layer may be about 2 to 20 times as thick as each of the skin layers. Examples of thickness ratios for two layer films such as represented in FIG. 2 include 90:10, 80:20, 70:30 etc. Thickness ratios for the three layered films such as shown in FIG. 1 include 5:90:5, 10:80:10, 15:70:15, 20:60:20, etc. The two skin layers do not have to be of equal thickness.

The extruded multilayer films which are machine-direction oriented may be prepared by the general procedure described and illustrated in FIGS. 3A–3C by coextruding charges of the film-forming resins for the layers of the multilayer film to form an extrudate.

Although FIG. 3A illustrates extrusion through cast film extrusion (i.e., through flat dies), the charge or charges for one or more layers can be extruded or coextruded in a known manner by blown film extrusion (i.e., by extrusion through circular dies) followed by passing of the blown stock between rolls.

With respect to the preferred embodiments, the charges may be prepared for extrusion or coextrusion through an extrusion die 70 and flat film casting, as schematically illustrated in FIG. 3A. The resin charge for the skin layers comprise, as noted above, an olefin-SPA blend containing from about 30% to about 60% by weight of SPA. The resin charge for the inner layer comprises a mixture of an olefin-SPA blend and a compatibilizer containing greater than 15% by weight up to about 40% by weight of SPA. The extruded film is cast on a first cooling roll 191, continues around a second cooling roll 192, and is advanced by pull-off rolls 193.

As mentioned earlier above, stiffness of the film is important to proper dispensing of labels at higher line speeds. FIG. 3B illustrates a hot-stretching station at which the Gurley stiffness of the flat stock M is increased in the machine-direction, preferably at a stretch ratio of between 2 and 9, more preferably between 3.5 and 7, and most preferably at about 4 to 6. The MD tensile modulus of the film is also increased by the stretching step, contributing to dimensional stability and good print registration. After passing around a pair of pre-heat rolls 201 and 202 which soften the stock, the softened stock is then stretched between the orientation roll pair 205 and 206, the latter rotating at a multiple of the speed of the pre-heat rolls, corresponding to the stretch ratio, say 5 to 1. The stock then passes over the annealing rolls 209, 210 at which it is annealed or heat-set, and finally passes over the chill roll 212 to complete the hot-stretch operation. The stock may then be taken up in roll form as seen in FIG. 3C.

In the context of the present invention, the immiscible olefin-SPA blend which is extrusion cast into the inner layer of the film also has a compatibilizer charge heated and blended therewith prior to extrusion. The compatibilizer or coupling agent comprises a polyolefin copolymerized with or grafted by a polar reactant. Upon extrusion through the hot die, the soft polar additive and the olefinic base material are chemically coupled by the compatibilizer or coupling agent.

The stiffness of the machine-direction-oriented multilayer film prepared by the general procedure described above should be at least about 10 Gurley in the machine-direction. In one preferred embodiment, the multilayer film is characterized as having a Gurley stiffness in the machine-direction greater than about 15. Stiffness is measured in accordance with the TAPPI Gurley Stiffness Test T 543 pm. The stiffness in the cross-direction should be substantially less than the stiffness in the machine-direction. In one embodiment, the Gurley value in the cross-direction is less than 0.75 times the machine-direction.

In the manufacture of label stock from the above-described multilayer films in accordance with the invention, liner or carrier stock 10 (FIGS. 4A–4D) may be provided. The liner or carrier stock 10 may comprise a multilayer liner made for example as disclosed in U.S. Pat. No. 4,713,273, the disclosure of which is incorporated herein by reference, or may be conventional liner or carrier consisting of a single paper or film layer which may be supplied in roll form. If it has not been previously provided with a release coating and does not itself include components to inherently generate a release surface at its adhesive-contacting face, the liner or carrier 10 may be coated with a release coating at station R, as shown in FIG. 4A. If a release coating is applied, it is dried or cured following application by any suitable means (not shown). If the liner or carrier 10 comprises a plastic extrudate, then prior to application of the release coating at station R, the formed films may be hot-stretched to provide orientation of the liner or carrier 20.

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, which now remains permanently joined to the facestock.

Thus, as indicated in FIG. 4A, adhesive may be applied at station S following drying or cure of the release coat previously applied at station R. this may be a tandem coating operation, or the adhesive coating may be on a separate coating line. Alternatively, the adhesive may be applied at some later time prior to the joining of the release liner or carrier 10 with the facestock 20. The joining of the liner or carrier with a facestock 20 is diagrammatically illustrated in FIG. 4B. Alternatively, the adhesive may be coated directly on the facestock 20 prior to the combining of the facestock and liner or carrier.

In some applications, the adhesive may be a heat-activated adhesive or a hot-melt adhesive such as used in in-mold label applications, as distinguished from a pressure-sensitive adhesive, in which case there may be no need for the provision of a release liner or inherent releasability such as is required when using a pressure-sensitive adhesive.

The label facestock may be printed at a printing station (not shown) prior to being die-cut into individual labels. The printing step may occur before or after the combining of liner and facestock, but will precede the die-cutting of the facestock into individual labels. The film must remain in accurate register between printing steps (for example, between successive impressions in different colors) in order that image or text be of high quality, and between printing and subsequent die-cutting in order that image or text be located properly on the labels. The film is under tension during printing, and may be subjected to some increase in temperature, as for example when UV inks are cured, and must not stretch significantly in the machine-direction. The MD tensile properties of the feedstock film are particularly important when a polymeric film liner is used or when no liner is required.

FIG. 4C diagrammatically illustrates the die-cutting of the facestock 20, at a station T, into a series of spaced pressure-sensitive labels 34 carried by the release liner or carrier 10. This step may be performed by rotary cutting dies in a well-known manner and involves the stripping of the ladder-shaped matrix (not shown) of waste or trim surrounding the formed labels when they are die cut (the "rungs" of the ladder representing the spacing between successive labels). The labels then remain on the liner in spaced relation with each other, as shown. One failure mode in this operation involves poorly die-cut labels remaining with the matrix as it is stripped. In this mode, as release levels decrease, poor die-cutting is more likely to caused labels to stay attached to the matrix material and be removed from the liner during matrix stripping. FIG. 4D illustrates the application of the labels 34 to passing workpieces 36 by use of a peel-back edge 38 to dispense the labels 34 by progressively removing the liner or carrier from them to thereby expose the adhesive side 39 of the labels and project the labels into contact with passing workpieces 36.

In the context of the present invention, the workpieces 36 may constitute rigid substrates such as glass bottles or other rigid articles tending to have irregularities in the surface and therefore requiting labels that are flexible and closely adhere (conform) to the surface without bridging local surface depressions.

It will be understood that the operations shown in FIGS. 4A to 4D may be done at different locations by different manufacturers, or they may be combined. For example, the steps of FIG. 4A may be performed by a liner and adhesive manufacturer, the steps of FIGS. 4B and 4C may be performed by a label manufacturer on one continuous pass rather than being interrupted by a wind/unwind sequence as illustrated, and the steps of FIG. 4D may be performed by a package of manufactured products.

Facestock which is formed into labels is usually wound and unwound in roll form, and is therefore one form of what is known as "roll stock" or "roll facestock," and the accompanying liner or carrier is called "roll liner."

The multilayer films which have been machine-direction oriented at a stretch ratio of between about 2 and 9 (inner layer and 1 or 2 skin layers) have a total thickness (caliper) of less than about 3 mils. The die-cut labels prepared from composites comprising the machine-direction oriented multilayer film and an adhesive layer provide acceptable labeling of rigid substrates such as glass with a label of sufficient flexibility and conformability to accommodate irregular or undulating glass surface characteristics resulting from the glass manufacturing process. Overly stiff label films such as biaxially oriented films tend to result in labels which bridge the depressions and mold seams in the glass surface, and the depressions appear as trapped air between the label and the glass surface.

Another advantage of the multilayer film facestocks described above and used in the die-cut labels of the invention is the improved die-cuttability of the labels. It has been observed, for example, that labels prepared with the multilayer facestock of the present invention are more easily die-cut as compared to films of the same materials and construction wherein the inner layer contains less than 15% by weight of SPA or more than 40% by weight of SPA. More particularly, the die-cutting of the labels of the present invention provide sharper and more distinct cuts with full separation of the label from the matrix along the cut label edge being achieved at a lower die-cutting pressure, and the cutting tool does not have to be as sharp when cutting the facestock label films of the present invention containing the specified amount of SPA in the mixtures of olefin-SPA blends and compatibilizer used in the inner layer. Failure to achieve a clean die-cut perimeter between the label and surrounding matrix can cause the matrix to break, in either the machine or cross directions, and remain with the label on the release liner. This defect will adversely effect the dispensing operation by applying a double label or label plus matrix strip(s) to the substrate.

The following Examples 1–5 illustrate die-cut labels of the invention as represented by FIG. 1 wherein the facestocks or multilayer films have an overall thickness of about 2.5 mils. In all of the examples, the label facestock comprises an inner layer of about 2 mils and skin layers on both sides of the core of about 0.25 mils. The inner layer in each of the examples is prepared from a physical blend of (1) a random copolymer comprising about 96.8% by weight of propylene and about 3.2% by weight of ethylene, (2) EVA, and (3) compatibilizer (Polybond® 3001). The two skin layers comprise 50% by weight of polypropylene and 50% by weight of EVA. The formulations for Examples 1–5 are summarized in the following Table I which also contains a description of the formulations of two control samples with varying amounts of random copolymer, EVA and compatibilizer in the inner layers.

TABLE I

| | Examples 1–5 | | | | |
|---|---|---|---|---|---|
| | Inner layer (%/w) | | | Skin Layers (%/w) | |
| Example | Random Copolymer | EVA | Compatibilizer | Polypropylene | EVA |
| 1 | 75 | 20 | 5 | 50 | 50 |
| 2 | 70 | 25 | 5 | 50 | 50 |
| 3 | 65 | 30 | 5 | 50 | 50 |
| 4 | 60 | 35 | 5 | 50 | 50 |
| 5 | 55 | 40 | 5 | 50 | 50 |
| Control | 85 | 10 | 5 | 50 | 50 |

In each of the Examples 1–5, a facestock film is prepared by combining the charges for each of the film layers in blenders prior to extrusion to provide a molten blend. The melt is then extruded as shown in FIG. 3A, and is then heated, stretched in the machine-direction only and heat set or annealed as illustrated in FIG. 3B. The final overall thickness of the film of each of the examples is 2.5 mils, and the multilayer film comprises two skin layers of 0.25 mils thickness each and an inner layer of 2 mils (a ratio of 10/80/10). A draw ratio of 5:1 is used so that the hot stretching in the machine-direction is 5:1 while there is essentially no stretching in the cross direction. The film is combined with a pressure-sensitive adhesive-coated release liner in a manner similar to that shown in FIG. 4B, the adhesive thereby transferring to the film. Labels are die-cut from the films in a manner similar to that shown in 4C leaving the labels spaced from each other as shown. The stiffness of the film in the machine-direction is sufficient to allow the labels to be dispensed onto rigid substrates such as glass bottles at line speeds of about 550 bottles per minute.

The physical characteristics of the multilayer films of Examples 1–5 and the Control are listed in the following Table II. Tensile modulus (1% secant) and ultimate tensile strength are determined using ASTM Test Procedure D882 for tensile properties of thin plastic sheeting. Stiffness is measured using TAPPI Test T 543 pm for testing stiffness of paper using a Gurley stiffness tester.

TABLE II

| | Physical Properties | | | | | | | |
|---|---|---|---|---|---|---|---|---|
| | Gurley Stiffness | | Tensile Modulus (psi) | | Tensile Strength (psi) | | Percent Elongation | |
| Example | MD | CD | MD | CD | MD | CD | MD | CD |
| 1 | 20 | 10.5 | 183,000 | 73,000 | 28,600 | 2900 | 49 | 899 |
| 2 | 19 | 10.0 | 180,000 | 67,000 | 27,300 | 2800 | 42 | 884 |
| 3 | 18 | 9.5 | 178,000 | 65,000 | 26,800 | 2700 | 42 | 912 |
| 4 | 17 | 9.0 | 175,000 | 60,000 | 26,000 | 2600 | 35 | 904 |
| 5 | 17 | 8.5 | 165,000 | 58,000 | 24,700 | 2500 | 44 | 962 |
| Control | 21 | 11.0 | 210,000 | 88,000 | 31,300 | 3100 | 45 | 914 |

The enhanced die-cuttability of the multilayer films and the composite constructions of the present invention is demonstrated by the results of the following tests. In the following tests, composite constructions are prepared which comprise the multilayer face, a pressure-sensitive adhesive and a 44-pound polycoated Kraft silicone release liner. In Test 1, rectangular shape labels (approximately 2.0 inch cross-direction and 3.375-inch machine-direction) are die-cut using a Rotometrics RD-80 test die not tooled for film facestocks at 100 and 150 feet per minute. Materials are cut with a clearance of 0.0020 inch between the anvil roll and the tip of the rotary blade at 350 pounds force on each side of the rotary die station, or 700 pounds force total. In Test 2, the composites are die-cut with an RD-80 60/40 paper die at 250 pounds pressure on each side (500 pounds force total) to form oval-shaped labels (approximately 3.5 inches cross-direction and 2.5 inches machine-direction) with a clearance of about 0.0020-inch and at jog speed of about 30 feet per minute. The dies used in Test 1 and Test 2 are used dies, and the RD-80 paper die used in Test 2 contains 2 known "nicks." The performance of the dies on the various composites is evaluated via a subjective rating where the No. 1 is assigned to poor result and the No. 10 represents an excellent result for tickers and ability to be die-cut at the known nicked spots. Tickers are evaluated by slowly peeling die-cut labels from their surrounding matrix on the release liner. If the label is not cut completely clean around its perimeter, it will produce "ticker" sounds upon separating itself from its corresponding matrix. The greater number of these "tickers" and therefore areas of not being cut through entirely, the lower the subjective rating and a poorer die-cutting result. The results of the die-cutting in Tests 1 and 2 on the facestock of Examples 3 and 4 and the Control are summarized in the following Table III.

TABLE III

| Facestock of Example | Die-Cuttability Rating | |
|---|---|---|
| | Test 1 RD-80 Test Die | Test 2 RD-8D Paper Die |
| 3 | 7 | 5 |
| 4 | 8 | 5 |
| Control | 1 | 3 |

As can be seen from the results reported in Table III, the ratings with the facestocks of the present invention are significantly higher than the facestock of the Control.

In another test (Test 3), the composites prepared from the facestocks of Examples 1–4 and the Control are die-cut with a standard Rotometrics RD-90 film test die at 350 pounds force on each side, 700 pounds force total. Rectangular shapes (approximately 2.0 inch cross-direction and 3.375 inch machine-direction) are die-cut with a clearance of 0.0020 inch. After the composites are die-cut under these conditions, they are evaluated for tickers and a subjective rating is assigned just as in Tests 1 and 2. The results of the tests wherein the composites are die-cut at 100 feet per minute and 150 feet per minute are summarized in the following Table IV. The higher the rating value, the better the result.

TABLE IV

| Facestock of Example | Die-Cuttability (Test 3) Rating | |
|---|---|---|
| | 100 fpm | 150 fpm |
| 1 | 4 | 5 |
| 2 | 3 | 4 |

TABLE IV-continued

| Facestock of Example | Die-Cuttability (Test 3) Rating | |
|---|---|---|
| | 100 fpm | 150 fpm |
| 3 | 8 | 9 |
| 4 | 8 | 5 |
| Control | 5 | 6 |

The composites contained in facestocks of Examples 1–5 and the Control also are evaluated for rectangular shaped label (approximately 1.75 inch cross-direction and 2.75 inch machine-direction) die-cuttability and surrounding matrix (approximately 0.125 inch wide at cross-direction sides and 0.125 inch wide at machine-direction sides) strippability with a RD-80 rotary die on the Propheteer press. In these tests, the minimum pounds force required on each side of the die to obtain 100% good cuts, unless noted, is recorded for each composite. The phrase 100% good cuts means no die-cut labels going up with the stripped matrix. A notation of 90% good indicates approximately 10% of the die-cut labels go up with the matrix and do not remain on the release liner. The results of these tests are summarized in the following Table V.

TABLE V

| Facestock of Example | RD-80 Die Results* | | | |
|---|---|---|---|---|
| | New Die | | Worn Die | |
| | 100 fpm | 150 fpm | 100 fpm | 150 fpm |
| 1 | 225 | 225 | 450 (70% good) | 400 |
| 2 | 200 | 200 | 450 (90% good) | 350 |
| 3 | 200 | 200 | 350 (90% good) | 275 |
| 4 | 200 | 200 | 350 (95% good) | 250 |
| 5 | 200 | 200 | 350 | 250 |
| Control | 350 (95% good) | 350 (99% good) | 450 (10% good) | 450 (40% good) |

*Minimum pounds of force on each side of die.

The results summarized in Table V demonstrate the improved die cuttability obtained with the facestocks of the present invention using either new dies or worn dies. A reduction in pounds force required to provide satisfactory die-cutting is a significant advantage which is obtained with the multilayer film facestocks of the present invention.

In summary, die-cut label constructions have been described which are characterized as having machine-direction stiffness (Gurley values) greater than 10 and preferably greater than 15, and the labels are conformable to various substrates, particularly rigid substrates such as glass while maintaining the desirable dispensability and printability properties. The labels of the present invention also exhibit enhanced die-cuttability with standard industry dies.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A label die-cut from a composite comprising:

(A) an extruded multilayer film oriented in the machine-direction at a stretch ratio between about 2:1 and about 9:1 and having a Gurley stiffness in the machine direction of at least 10 which comprises (A-1) at least one skin layer comprising an olefin-SPA blend comprising from about 30% to about 60% by weight of SPA; and (A-2) at least one inner layer which is thicker compared to the thickness of the skin layer or layers comprising a mixture of an olefin-SPA blend and a compatibilizer wherein the mixture comprises greater than 15% by weight up to about 40% by weight SPA, and wherein the total thickness of said at least one skin layer (A-1) and said inner layer (A-2) is less than about 3 mils; and (B) an adhesive layer associated with said film for adhering said label to a substrate.

2. The label of claim 1 wherein the multilayer film is oriented in the machine-direction at a stretch ratio of between about 3:1 and about 7:1.

3. The label of claim 1 wherein the multilayer film (A) comprises an inner layer and two skin layers.

4. The label of claim 1 wherein the mixture of compatibilizer and olefin-SPA blend in the inner layer comprises from about 20% to about 40% by weight of SPA.

5. The label of claim 1 wherein the SPA in the olefin-SPA blends is EVA.

6. The label of claim 1 wherein the olefin in the olefin-SPA blends is selected from the group consisting of propylene homopolymers, propylene-ethylene copolymers containing less than about 10% by weight of ethylene, and blends of polypropylene and polyethylene containing less than about 10% by weight of polyethylene.

7. The label of claim 6 wherein the copolymers and blends contain less than about 6% by weight of polyethylene.

8. The label of claim 4 wherein the SPA in the olefin-SPA blends is EVA.

9. A label die cut from a composite comprising:

(A) an extruded multilayer film oriented in the machine-direction at a stretch ratio of between about 4:1 and about 6:1 and having a Gurley stiffness in the machine direction of at least 10 which comprises (A-1) at least one skin layer comprising an olefin-EVA blend comprising from about 30% to about 60% by weight of EVA; and (A-2) at least one inner layer which is thicker compared to the thickness of the skin layer or layers comprising a mixture of an olefin-EVA blend and a compatibilizer wherein the mixture comprises from about 25% to about 40% by weight of EVA and wherein the total thickness of said at least one skin layer (A-1) and said inner layer (A-2) is less than about 3 mils; and (B) an adhesive layer associated with said film (A) for adhering said label to a substrate.

10. The label of claim 9 wherein the film (A) is further characterized as having a Gurley stiffness in the machine-direction of greater than about 15.

11. The label of claim 9 wherein the film (A) comprises two skin layers and one inner layer between the two skin layers.

12. The label of claim 11 wherein the thickness ratio of the skin-core-skin layers of the film (A) is about 10:80:10.

13. The label of claim 9 wherein the olefin-EVA blend of the skin comprises from about 40% to about 60% by weight of EVA.

14. The label of claim 9 wherein the inner layer also comprises an inorganic filler.

15. The label of claim 14 wherein the filler is titanium dioxide.

16. The label of claim 9 wherein the olefin in the olefin-EVA blends is selected from the group consisting of propylene homopolymers, propylene-ethylene copolymers containing less than about 10% by weight of ethylene, and blends of polypropylene and polyethylene containing less than about 10% by weight of polyethylene.

17. The label of claim 9 wherein the mixture of compatibilizer and olefin-EVA blend in the inner layer comprises from about 25% to about 35% by weight of EVA.

18. A multilayer composite comprising:

(A) a label facestock material comprising an extruded film oriented in the machine-direction at a stretch ratio between about 2:1 and about 9:1 and having a Gurley stiffness in the machine direction of at least 10 which comprises (A-1) at least one skin layer comprising an olefin-SPA blend comprising from about 30% to about 60% by weight of SPA; and (A-2) at least one inner layer which is thicker compared to the thickness of the skin layer or layers comprising a mixture of an olefin-SPA blend and a compatibilizer wherein the mixture comprises greater than 15% by weight up to about 40% by weight SPA, and wherein the total thickness of said at least one skin layer (A-1) and said inner layer (A-2) is less than about 3 mils;

(B) an adhesive layer associated with said film for adhering said label to a substrate; and (C) a release-coated liner or carrier.

19. In combination, a label of claim 1 joined with the layer of adhesive (B) to a substrate.

20. The combination of claim 19 wherein the substrate is a deformable or rigid substrate.

21. The combination of claim 19 wherein the substrate is a glass bottle.

* * * * *